US012590810B2

(12) United States Patent
Rathod

(10) Patent No.: US 12,590,810 B2
(45) Date of Patent: Mar. 31, 2026

(54) NAVIGATION ASSISTANCE SYSTEM FOR VEHICLES AND A METHOD THEREOF

(71) Applicant: L&T TECHNOLOGY SERVICES LIMITED, Chennai (IN)

(72) Inventor: Manishkumar Rathod, Pune (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 76 days.

(21) Appl. No.: 18/605,973

(22) Filed: Mar. 15, 2024

(65) Prior Publication Data

US 2025/0093172 A1     Mar. 20, 2025

(30) Foreign Application Priority Data

Sep. 14, 2023    (IN) .............................. 202341062090

(51) Int. Cl.
| | |
|---|---|
| *G01C 21/00* | (2006.01) |
| *B60Q 3/283* | (2017.01) |
| *B60Q 9/00* | (2006.01) |
| *G01C 21/36* | (2006.01) |

(52) U.S. Cl.
CPC ......... *G01C 21/3632* (2013.01); *B60Q 3/283* (2017.02); *B60Q 9/00* (2013.01); *G01C 21/3652* (2013.01)

(58) Field of Classification Search
CPC ........... G01C 21/3632; G01C 21/3652; G01C 21/3629; G01C 21/265; G01C 21/00; B60Q 3/283; B60Q 9/00; B60K 2360/166; B60K 2360/338; B60K 35/21; B60K 35/25; B60K 2360/782

USPC ......................................................... 701/431
See application file for complete search history.

(56) References Cited

U.S. PATENT DOCUMENTS

| | | | |
|---|---|---|---|
| 10,259,324 B2 | 4/2019 | Takamatsu et al. | |
| 11,467,401 B2 | 10/2022 | Richards | |
| 2006/0070795 A1* | 4/2006 | Meissner | B62D 1/046 |
| | | | 180/446 |
| 2013/0241747 A1* | 9/2013 | Hatakeyama | G08G 1/166 |
| | | | 340/901 |
| 2019/0322212 A1* | 10/2019 | Kastner | B60Q 3/80 |

FOREIGN PATENT DOCUMENTS

| | | |
|---|---|---|
| CN | 101424536 A | 5/2009 |
| CN | 102879001 A | 1/2013 |
| JP | 2010254201 A | 11/2010 |

(Continued)

*Primary Examiner* — Shardul D Patel
(74) *Attorney, Agent, or Firm* — Kendal M. Sheets

(57) ABSTRACT

The present disclosure relates to a technique for providing navigation assistance to both the driver as well as other vehicle occupants of the vehicle. The technique recites acquiring a placement information for a plurality of light sources and haptic sensors inside the vehicle such as to attract the attention of the driver only in the peripheral vision, without any requirement to take the eyes off the road. It also discloses a navigation unit and an ambient light sensing module configured to provide navigation information and the ambient light information respectively to the control unit. The control unit in turn processes this received information and control the functioning of both the light sources as well as the haptic sensors in order to update the driver and passengers about the upcoming navigation events.

14 Claims, 7 Drawing Sheets

(56) References Cited

FOREIGN PATENT DOCUMENTS

| TW | 375013 | B | 10/2012 |
| WO | 2022120644 | A1 | 6/2022 |

* cited by examiner

200

300

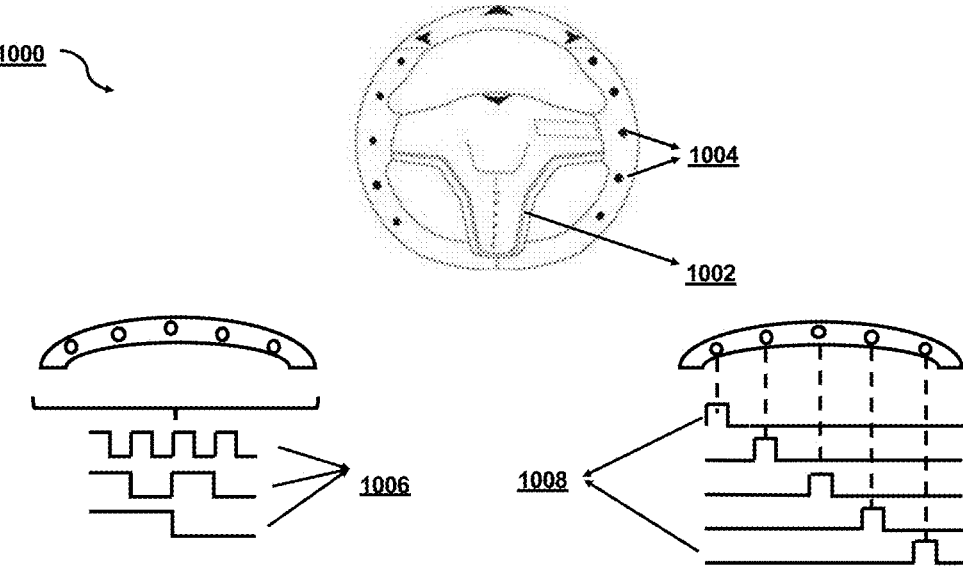

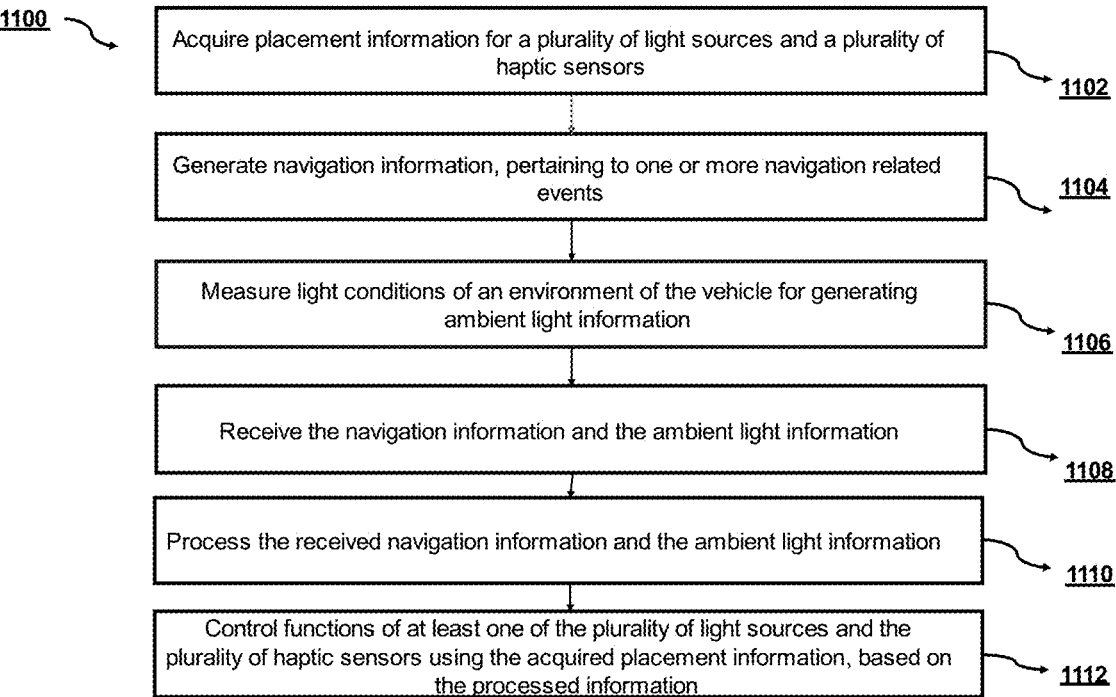

1100

| Acquire placement information for a plurality of light sources and a plurality of haptic sensors | 1102 |

| Generate navigation information, pertaining to one or more navigation related events | 1104 |

| Measure light conditions of an environment of the vehicle for generating ambient light information | 1106 |

| Receive the navigation information and the ambient light information | 1108 |

| Process the received navigation information and the ambient light information | 1110 |

| Control functions of at least one of the plurality of light sources and the plurality of haptic sensors using the acquired placement information, based on the processed information | 1112 |

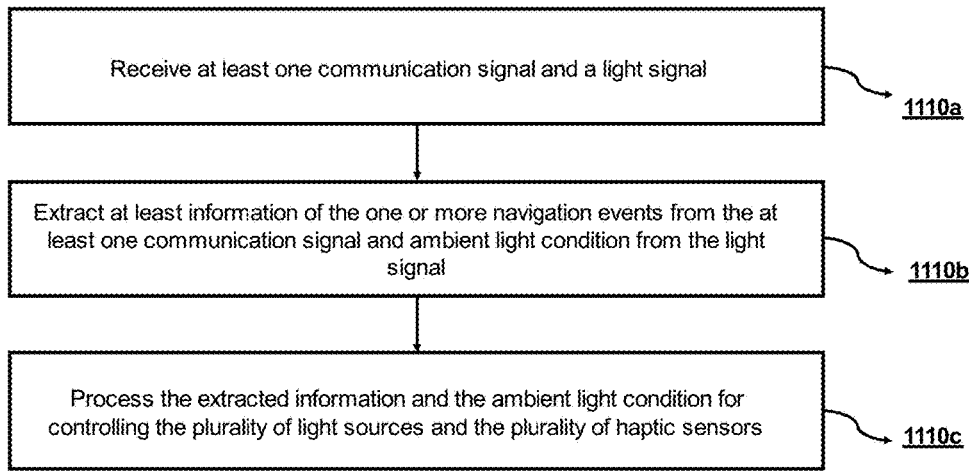

Receive at least one communication signal and a light signal

1110a

Extract at least information of the one or more navigation events from the at least one communication signal and ambient light condition from the light signal 1110b Process the extracted information and the ambient light condition for controlling the plurality of light sources and the plurality of haptic sensors 1110c

Figure 11A

NAVIGATION ASSISTANCE SYSTEM FOR VEHICLES AND A METHOD THEREOF

TECHNICAL FIELD

The present invention generally relates to the field of navigation system and more particularly it relates to providing a system and a method for assisting a vehicle in navigation using various means such as plurality of light sources and plurality of haptic sensors.

BACKGROUND

The following description includes information that may be useful in understanding the present invention. It is not an admission that any of the information provided herein is prior art or relevant to the presently claimed invention, or that any publication specifically or implicitly referenced is prior art.

Navigation systems are of utmost importance when it comes to navigating through a new route or embarking towards a new destination. In the existing scenario, for providing navigational information to a driver of the vehicle, internal display unit like dashboard of the vehicle is widely used alternatively, people use smart devices such as mobile phone to check the navigation details. However, sometimes, to check the navigation information, the driver of the vehicle keeps on gazing the screen in order to comprehend the next suggested navigational event. Looking at navigation screen, even for few seconds may distract the driver while driving which leads to increase the probability of accidents. Further, sometimes, the driver's smart phone may be located in an area within the vehicle, where it is difficult to read or see the navigation information e.g., if the smart phone is placed within a cup holder. At such instances, it become difficult to understand the navigation information and the driver keeps on struggling to get navigation information while driving the vehicle.

There is therefore a need for a technique that may overcome the above-mentioned difficulties and further assist the driver in providing navigation information.

SUMMARY OF THE INVENTION

The present disclosure overcomes one or more shortcomings of the prior art and provides additional advantages. Embodiments and aspects of the disclosure described in detail herein are considered a part of the claimed disclosure.

In one non-limiting embodiment of the present disclosure, a navigation assistance system is disclosed. The system comprises a plurality of light sources placed at one or more inner peripheral surfaces of the vehicle to illuminate in a pre-defined pattern along with a plurality of haptic sensors placed on a steering wheel of the vehicle to generate haptic feedback, in a predefined pattern. It further comprises a navigation unit, an ambient light sensing module and a control unit. The navigation unit is configured to generate navigation information pertaining to one or more navigation related events and the ambient light sensing module is configured to measure light conditions of an environment of the vehicle to generate ambient light information. The control unit of the disclosed system is communicatively coupled to the plurality of light sources, the plurality of haptic sensors, the ambient light sensing module, and the navigation unit. It is configured to receive the navigation information and the ambient light information. The control unit is further configured to process the received navigation information and the ambient light information. Further, the control unit is configured to control the functioning of at least one of the plurality of light sources and at least one of the plurality of haptic sensors, based on the processed information.

In yet another embodiment of the present disclosure, one or more inner peripheral surfaces comprises at least one of: windscreen rail/Sun Visor, Dash panel, A Pillars (A-Post), and upper arc of the Steering wheel of the vehicle, Center pillars (BC-post) and back of front seats to provide navigation assistance to vehicle occupants. Further, the plurality of haptic sensors is placed at a left and right arch of the steering wheel to provide navigation assistance to a vehicle driver.

In yet another embodiment of the present disclosure, the received navigation information by the control unit comprises at least one communication signal corresponding to the one or more navigation related events.

In yet another embodiment of the present disclosure, to control the functioning of the at least one of the plurality of light sources, the control unit is configured to adjust illumination and characteristic of light received from the at least one of the plurality of light sources, in accordance with the ambient light information and the navigation information, wherein the characteristic of the light comprises color and light intensity.

In yet another embodiment of the present disclosure, to control functioning of the plurality of haptic sensors, the control unit is configured to adjust vibration pattern and frequency of the at least one of the plurality of haptic sensors in accordance with the navigation information.

In yet another embodiment of the present disclosure, to process the received navigation information and the ambient light information, the control unit is configured to receive at least one communication signal from the navigation unit and a light signal from the ambient light sensing module. The control unit is further configured to extract at least one of: information of the one or more navigation events from the at least one communication signal and ambient light condition from the light signal. Further, the control unit is configured to process the extracted information and the ambient light condition to control the plurality of light sources and the plurality of haptic sensors.

In yet another embodiment of the present disclosure, a method for providing navigation assistance in a vehicle is disclosed. The method comprises acquiring placement information for a plurality of light sources and a plurality of haptic sensors. The method further comprises generating navigation information, pertaining to one or more navigation related events. The method further comprises measuring light conditions of an environment of the vehicle for generating ambient light information. The method comprises receiving the navigation information and the ambient light information and processing the received navigation information and the ambient light information. Further, the method comprises controlling functions of at least one of the plurality of light sources and the plurality of haptic sensors using the acquired placement information, based on the processed information.

In yet another embodiment of the present disclosure, the method comprises receiving at least one communication signal corresponding to the one or more navigation related events.

In yet another embodiment of the present disclosure, for controlling functions of the at least one of the plurality of light sources, the method comprises adjusting illumination and characteristic of light received from the at least one of the plurality of light sources, in accordance with the ambient light information and the navigation information, wherein the characteristic of the light comprises color and light intensity.

In yet another embodiment of the present disclosure, for controlling functions of the at least one of the plurality of haptic sensors, the method comprises controlling functions of the at least one of the plurality of haptic sensors comprises adjusting vibration pattern and frequency of the at least one of the plurality of haptic sensors in accordance with the navigation information.

In yet another embodiment of the present disclosure, for processing the received navigation information and the ambient light information, the method comprises receiving at least one communication signal and a light signal. Further, the method comprises extracting at least one of: information of the one or more navigation events from the at least one communication signal and ambient light condition from the light signal. Further, the method comprises processing the extracted information and the ambient light condition for controlling the plurality of light sources and the plurality of haptic sensors.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The features, nature, and advantages of the present disclosure will become more apparent from the detailed description set forth below when taken in conjunction with the drawings in which like reference characters identify correspondingly throughout. Some embodiments of system and/or methods in accordance with embodiments of the present subject matter are now described, by way of example only, and with reference to the accompanying Figs., in which:

FIG. 10 depicts exemplary vibration patterns generated by haptic sensors to alert the driver about the upcoming navigation event, in accordance with the embodiments of the present disclosure.

FIG. 11 represents a flowchart 1100 of an exemplary method for providing navigation assistance, in accordance with the embodiments of the present disclosure.

FIG. 11A represents a flowchart of an exemplary method for processing the information required for navigation assistance, in accordance with the embodiments of the present disclosure.

Figure 1A:
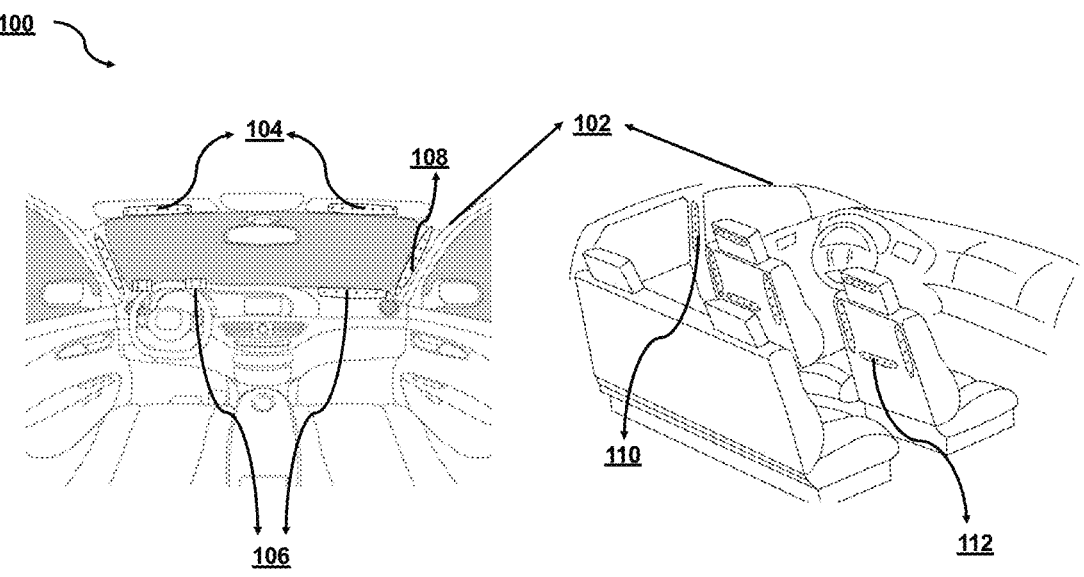
FIG. 1A depicts an exemplary environment 100 of a driving vehicle, where plurality of light sources is placed at inner peripheral surfaces of the vehicle to assist in navigation, in accordance with the embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in a computer readable medium and executed by a computer or processor, whether or not such computer or processor is explicitly shown.

DETAILED DESCRIPTION

The foregoing has broadly outlined the features and technical advantages of the present disclosure in order that the detailed description of the disclosure that follows may be better understood. It should be appreciated by those skilled in the art that the conception and specific embodiment disclosed may be readily utilized as a basis for modifying or designing other structures for carrying out the same purposes of the present disclosure.

The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Navigation systems are of utmost importance when it comes to navigating through a new route or embarking towards a new destination. Conventionally, vehicles come with a navigation assistance apparatus which aim to assist the driver and provide the requisite navigational event information in order to reach the pre-defined destination. These navigation assistance apparatuses generally provide either audio signals or display the necessary turn events on a navigational screen of either the mobile device or the infotainment system embedded in the vehicle. In order to obtain the visual information about the navigational turn events, the driver has to look at the screen by taking the attention off from the road thus leading to distraction in driving. Further, the ambient conditions inside the vehicle and the environmental conditions of the route may be different, therefore, sometimes pupil of the eyes needs to be adjusted when driver shifts his/her vision to and from between the road and the navigational screen. This leads to fatigue and in return, the driver may lose focus or distract, which may lead to disastrous accidents. Further, many a time, the mobile device used for providing navigation assistance information may be located in a difficult to view area within the vehicle. In such scenario, it may require more effort in reading and understanding the navigation information present on the mobile device.

In order to overcome the above-mentioned challenges, the present disclosure provides a navigation assistance system to aid the driver while navigating through the routes to reach a pre-defined destination. In particular, the present disclosure employs a combination of plurality of light sources and a plurality of haptic sensors that are placed inside the vehicle to aid the driver in navigating through the route. The plurality of light sources is placed at one or more inner peripheral surfaces of the vehicle in such a manner that the light received through these light sources may be observed by the driver without any difficulty. In Particular, the driver need not require looking directly (no direct vision required) at the light sources by taking the focus off from the road as the lights are in the peripheral vision of the driver. The driver, therefore, only needs to see the ambient lights in the peripheral vision. Further, the intensity of the lights may be configured as per the light conditions of the environment of the vehicle. For instance, in a non-limiting exemplary scenario, during daytime, based on the light conditions of the environment, there will be more requirement of illumination intensity of light to assist the driver of the vehicle in navigation whereas during night-time, even low intensity may be sufficient to assist the driver. So, the idea is not to disturb the driver or vehicle occupants but to aid in the navigation with minimum or no distraction. A detailed explanation of the proposed solution is disclosed in the forthcoming paragraphs.

In the present disclosure, the term "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", "include", "including", or any other variations thereof, are intended to cover a non-exclusive inclusion, such that a device that comprises a list of components does not include only those components but may include other components not expressly listed or inherent to such setup or device. In other words, one or more elements in a system or apparatus proceeded by "comprises . . . a" does not, without more constraints, preclude the existence of other elements or additional elements in the system or apparatus.

The terms like "at least one" and "one or more" may be used interchangeably or in combination throughout the description.

The terms like "smart phone" and "mobile device", may be used interchangeably or in combination throughout the description.

The terms like "vehicle occupants" and "passengers", may be used interchangeably or in combination throughout the description.

The term "vehicle" used in the present disclosure comprises vehicles such as Hatchback, Sedan, Tough Utility Vehicle (TUV), Kool Utility Vehicle (KUV), Sport Utility Vehicle (SUV), Crossover Utility Vehicle (XUV), Multi Utility Vehicle (MUV), Coupe, Convertible, and Pickup Truck, and the like. The following description is written in the context of a car as a vehicle, by way of example.

FIG. 1A depicts an exemplary environment 100 of a driving vehicle 102 which has the navigation assistance system. The navigation system comprises the plurality of light sources placed at one or more inner peripheral surfaces of the vehicle and the plurality of haptic sensors placed on a steering wheel of the vehicle to aid the navigation without any need for the driver to take the attention off the roads while driving the vehicle.

FIG. 1A in the left image presents perspective view of placement of the plurality of lights sources at one or more inner peripheral surfaces of the vehicle enabling the driver to read/see the illumination received from the plurality of the light sources in the peripheral vision, thus catching the attention of the driver along with the attention of the other vehicle occupants without leading to any sort of distraction or discomfort. The plurality of light sources may be selected from light-emitting diode (LED), organic light-emitting diode (OLED), Plastic-OLED (P-OLED), Flexible-OLED (F-OLED) etc. The one or more inner peripheral surfaces, where the plurality of light sources may be placed includes windscreen rail/Sun Visor 104, Dash panel 106, A Pillars (A-Post) 108, Centre pillars (BC-post) 110 and back of front seats 112 of the vehicle 102 in one non-limiting embodiment.

Particularly, in FIG. 1A, placement of plurality of light sources is presented for the vehicle occupants. For receiving attention of the vehicle occupants, the plurality of light sources is placed around the front side of the vehicle that covers the areas like windscreen rail/Sun Visor 104, Dash panel 106, A Pillars (A-Post) 108. Illumination from the light sources, placed in these positions may help the vehicle occupants specially driver of the driver to receive navigation related information with ease.

In FIG. 1A, right side image, projects the perspective view of placement of plurality of light sources for the rear seat passengers. Passengers occupying the rear seat may use to check the navigation information on their personal gadgets (with navigation related application installed) during their journey or sometimes, they ask the driver about this information during their journey. Most of the times, the passengers while using a taxi or cab service may guide the driver in their own way whereas the driver was following the map information. In such situations, they usually disturb the driver of the vehicle to know about the navigation related event information. With the help of present disclosure even the rear seat passengers may receive same information about the navigation events, which the driver is receiving while driving the vehicle through the navigation assistance system This may keep the rear seat passengers updated about the upcoming navigation event that the driver may follow. To enable the rear seat occupants aware about the navigation information, the plurality of light sources is placed on Centre pillars (BC-post) 110 and back of front seats 112 of the vehicle 102 as well. Illumination from the light sources, placed at these locations, may help the rear passengers to know about the navigation information or navigation related events that is presented to driver of the vehicle through the navigation assistance system. The navigation related events may comprises any maneuvering turn-by-turn events hosted by a navigation unit. For example, the one or more navigation related events or manicuring turn-by-turn events may comprise at least one of: Turn left, turn right, straight, Ramp up or down, Clockwise U Turn, and Anticlockwise U turn. In an exemplary scenario, when the next navigation related event is detected as "turn left". The plurality of light sources present near the inner peripheral region near the left side seat gets illuminated and corresponding to this event for rear-passenger convenience, the plurality of light sources placed on back seat of the left side may also get illuminated. Similarly, the plurality of light sources gets illuminated based on the one or more navigation events. The light sources presented in FIG. 1A are illuminated in particular patterns which are explained in the upcoming paragraphs in conjunction with FIG. 2, FIG. 9 of the present disclosure.

Figure 1B:
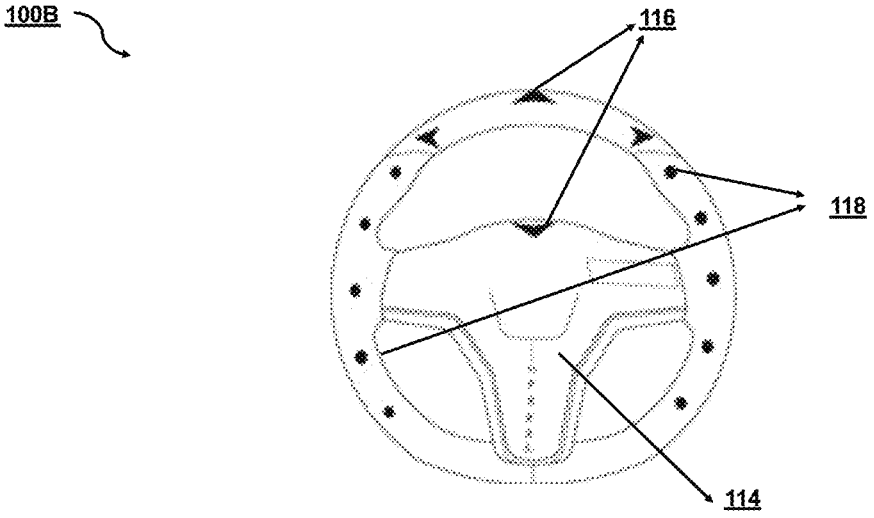
FIG. 1B depicts an exemplary steering wheel of a driving vehicle where plurality of light sources along with plurality of haptic sensors are placed on the steering wheel to assist the driver in navigation, in accordance with the embodiments of the present disclosure.

FIG. 1B depicts an exemplary steering wheel 100B of the driving vehicle 102. In one non-limiting embodiment, the plurality of light sources may be placed at the upper arc 116 and the hub 114 of the steering wheel 100B to catch attention of the driver while navigating and suggest the upcoming navigation event without causing any distraction. Further, in one non-limiting embodiment, the haptic sensors 118 may be placed at a left and right arch of the hub 114 of the steering wheel 100B to generate vibration alert for the driver based on the navigation information. In particular, based on the one or more navigation related events, the control unit sends haptic feedback to the haptic sensors mounted on the steering wheel of the vehicle. In an exemplary embodiment, on receiving a "Turn Left" navigation related event, the control unit may send vibration alert to the haptic sensors located on left arch of the steering wheel of the vehicle. Similarly, based on the navigation related events, feedback is generated for the haptic sensors by the control unit and based on the same, vibration pattern is generated in the corresponding arch of the steering wheel, where haptic sensors are located. Same is explained in the upcoming paragraphs in conjunction with FIG. 2 of the present disclosure.

Figure 2:
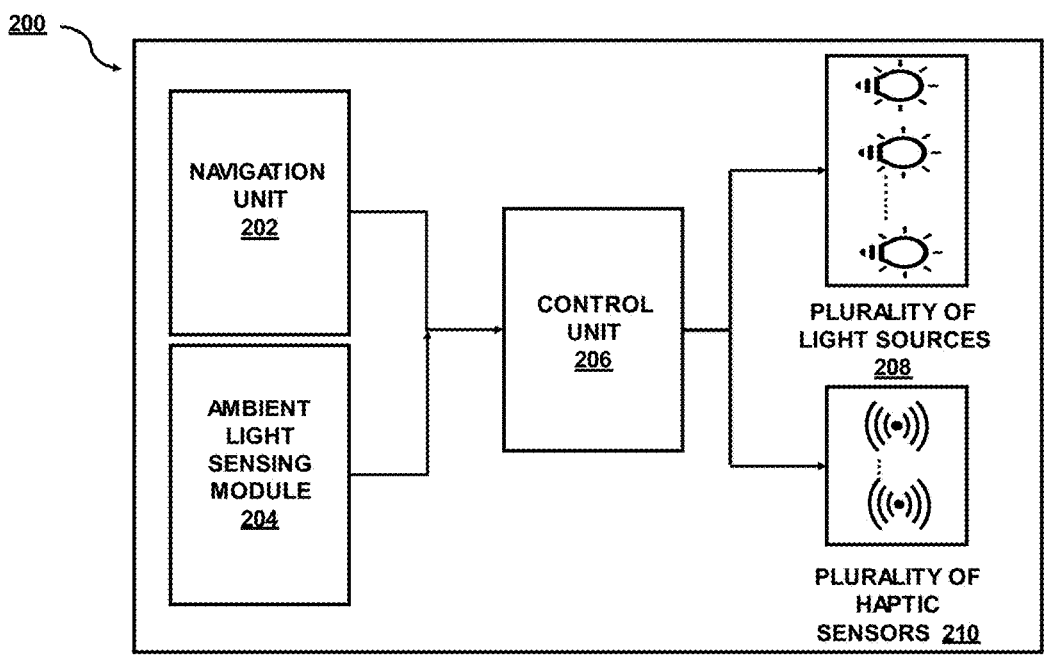
FIG. 2 depicts an exemplary block diagram 200 illustrating a system to provide navigation assistance, in accordance with the embodiments of the present disclosure.

FIG. 2 depicts an exemplary block diagram 200 illustrating a system to provide navigation assistance to the driver as well as to the other vehicle occupants/passengers present in the driving vehicle 102. The navigation assistance system 200 comprises a navigation unit 202 such that it is configured to generate navigation information pertaining to one or more navigation related events to assist in navigating the routes and maneuvering turn-by-turn events to a pre-defined destination. The navigation assistance system 200 further comprises an ambient light sensing module 204 to measure light conditions of an environment of the vehicle to generate ambient light information. Communication signal(s) received from the navigation unit 202 and the ambient light information received from the ambient light sensing module 204 are fed to the control unit 206 via any suitable connection for processing. For example, the connection may be established via USB or Bluetooth or CAN (Control Area Network) etc. for processing. To process the received navigation information and the ambient light information, the control unit 206 extracts the information about one or more navigation related events from the communication signal and ambient light condition information from a light signal. This extracted information when processed is used to control the plurality of light sources 208 and the plurality of haptic sensors 210 which are communicatively coupled with the control unit 206. Now in one non-limiting embodiment of the present disclosure, the navigation unit 202 may be facilitated by a voice recognition-module or by a navigation application SDK. Further, depending on the approach being facilitated by the navigation unit 202 for navigating and manicuring turn by turn events, the communication signal(s) from the navigation unit 202 may be received either in the form of an audio signal or an Application Programming Interface (API) signal. In particular, the audio signal is received by the navigation unit as communication signal when the navigation information is received through a navigation feature. The navigation feature represents a navigation application installed on the mobile device for receiving navigation information. The API signal is received by the navigation unit as communication signal when the navigation information is received through Software Development Kit (SDK). In one of the exemplary embodiment, these audio signal or API signal are received by the navigation unit via a mobile device. In another exemplary embodiment, these audio signal or API signal are received by the navigation unit via infotainment unit. In yet another embodiment, these audio signal or API signal are received by the navigation unit via combination of mobile device and the infotainment unit. Based on the communication signal information and the ambient light information, the control unit 206 is configured to control the plurality of light sources 208 and the plurality of haptic sensors 210 which are communicatively coupled with the control unit 206. In particular, the Control unit 206 processes these associated information and control the characteristics of light generated by the plurality of light sources 208 and control the vibration pattern and frequency of the vibration generated by the plurality of haptic sensors.

A person skilled in the art may appreciate that the control unit 206 may be implemented as one or more microprocessors, microcomputers, microcontrollers, digital signal processors, central processing units, state machines, logic circuitries, and/or any devices that manipulate signals based on operational instructions. Further, the navigation unit 202 may be implemented by at least one of the mobile device and an infotainment unit of the vehicle 102.

Figure 3:
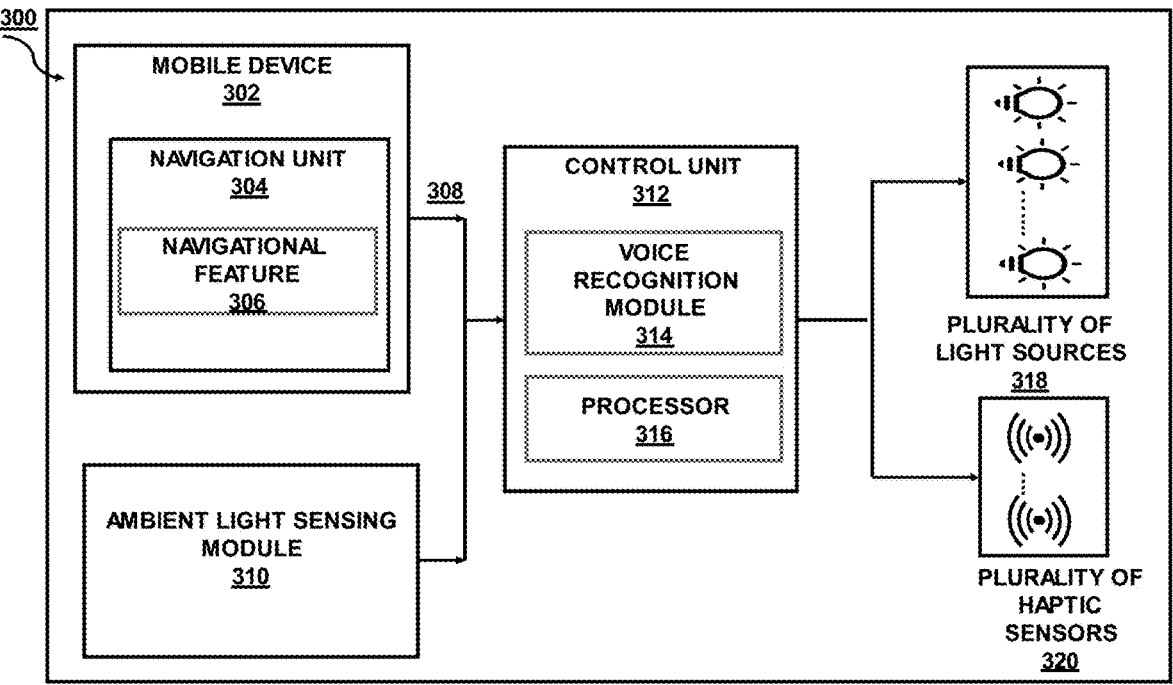
FIG. 3 depicts an exemplary block diagram 300 illustrating a system to provide navigation assistance using voice recognition via a mobile device, in accordance with some embodiments of the present disclosure.

Now in one non-limiting embodiment of the present disclosure, the navigation assistance system 200 is facilitated by voice recognition module which in turn is being implemented by a mobile device as illustrated in FIG. 3 of the present disclosure. FIG. 3 thus illustrates a navigation assistance system 300 which consists of a mobile device 302. This mobile device 302 has a navigation unit 304 which is well equipped to provide navigational feature 306 along with other relevant features associated with it. This navigation unit 304 of the mobile device 302 is capable of generating communication signals 308 indicating the navigational information and guiding about the upcoming one or more navigational events. The navigation events may comprises any maneuvering turn-by-turn events hosted by a navigation unit 304. In an exemplary embodiment, the one or more navigation related events or maneuvering turn-by-turn events comprise at least one of: Turn left, turn right, straight, Ramp up or down, Clockwise U Turn, and Anti-clockwise U turn. In one non-limiting embodiment, the communication signal 308 generated by the navigation unit 202 may be provided to the control unit via at least one communication protocol. In particular, there may be any communication protocol (i.e., set of rules) that is used to share communication signal from navigation unit to the control unit or vice-versa. In an exemplary embodiment, the communication protocol such as Bluetooth, USB, CAN or any other protocol supported by both the entities, may be used to provide the communication signal generated by the navigation unit 202 to the control unit. Before sharing the communication signal, it should be ensured that both the entities i.e., navigation unit and the control unit supports the communication protocol. The audio signals shared by the navigation unit provide the information about the navigating route while maneuvering turn by turn events. Further, in another non-limiting embodiment of the present disclosure, the navigation unit 304 of the mobile device 302 may also generate pictorial information and display it on the screen of the mobile device 302 in addition to the communication signal 308.

Further, the navigation assistance system 300 comprises of an ambient light sensing module 310 which is configured to measure the light conditions of an environment of the vehicle and generate the information regarding the same. This information is further transmitted to the Control unit 312 which utilizes it to control the illumination and characteristic of the light generated by the plurality of light sources such that it does not disturb the driver and is just optimum enough to catch driver's attention in his peripheral view. In an exemplary embodiment, the characteristic of light generated from the plurality of light sources comprises colour and light intensity. For example, the intensity of light generated from the plurality of light sources should be required more in daytime as compared to evening time. In another embodiment, variation in the colour of light may also be provided corresponding to the one or more navigation related events.

Both the communication signal 308 received from the navigation unit 304 and the ambient light information received from the ambient light sensing module 310 are required to be transmitted to the Control unit 312. However, for processing the navigation information, the control unit 312 invokes a voice recognition module 314 through a customized processor. The voice reorganization module 314 provides the Turn-by-Turn Navigation information to the customized processor which in turn generate control signals for controlling functioning of the plurality of light sources and the plurality of haptic sensors. In particular, the voice reorganization module 314 includes vocabulary related to navigation related events which helps in identifying the turn-by-turn navigation related events. This voice recognition module 314 is configured to receive the communication signal 308 from the navigation unit present on the mobile device 302 via a communication protocol and same communication signal is utilized to analyse the corresponding navigation events. For example, the control unit may extract the information of the one or more navigation events from the at least one communication signal. For instance, in one non-limiting exemplary scenario, if the audio signal 308 from the navigation unit 304 of the mobile device 302 recites "Turn Right in 100 meters" then the voice recognition module 314 is configured to read this communication signal 308 and generate the corresponding navigation event, let us say, "TR100". In similar way, all the navigation related events (such as directions specifications and maneuvering turn by turn events) may be defined in the system and the corresponding information may be extracted whenever occurrence of event is received in form of communication signal by the control unit.

Now in one non-limiting embodiment of the present disclosure, the voice recognition module 314 may transmit the generated navigation related event information to the processor 316 of the control unit which in turn, processes the extracted information, and generates the corresponding control signals to control functioning of illumination of the plurality of light sources 318 as well as plurality of haptic sensors 320. For instance, in one non-limiting exemplary scenario, for the received navigational event information "TR100", the control unit 312 may send the control signals to illuminate the plurality of light sources 318 placed at the right side (as illustrated in FIG. 1B) of the driving vehicle 102 and also send the haptic feedback to the plurality of haptic sensors 320 placed at the right arch of the steering wheel 110C as illustrated in FIG. 1B. Further, the generated ambient light information by the ambient light sensing module 310 is also received as the input by the processor 316 of the control unit 312 which analyses the received signal. The processor 316 of the control unit 312 processes the ambient light information associated with the light signal to generate the control signal for adjusting the intensity of the illuminated plurality of light sources 318. In one non-limiting embodiment of the present disclosure, the control unit 312 may be further configured to vary the patterns of illumination for the plurality of light sources 318. Same is explained in the upcoming paragraphs in conjunction with FIG. 9. Further, in another non-limiting embodiment of the present disclosure, the control unit 312 may be further configured to vary the patterns of generating the vibrations via the plurality of haptic sensors 320 which is explained in the upcoming paragraphs in conjunction with FIG. 10 of the present disclosure.

Figure 4:
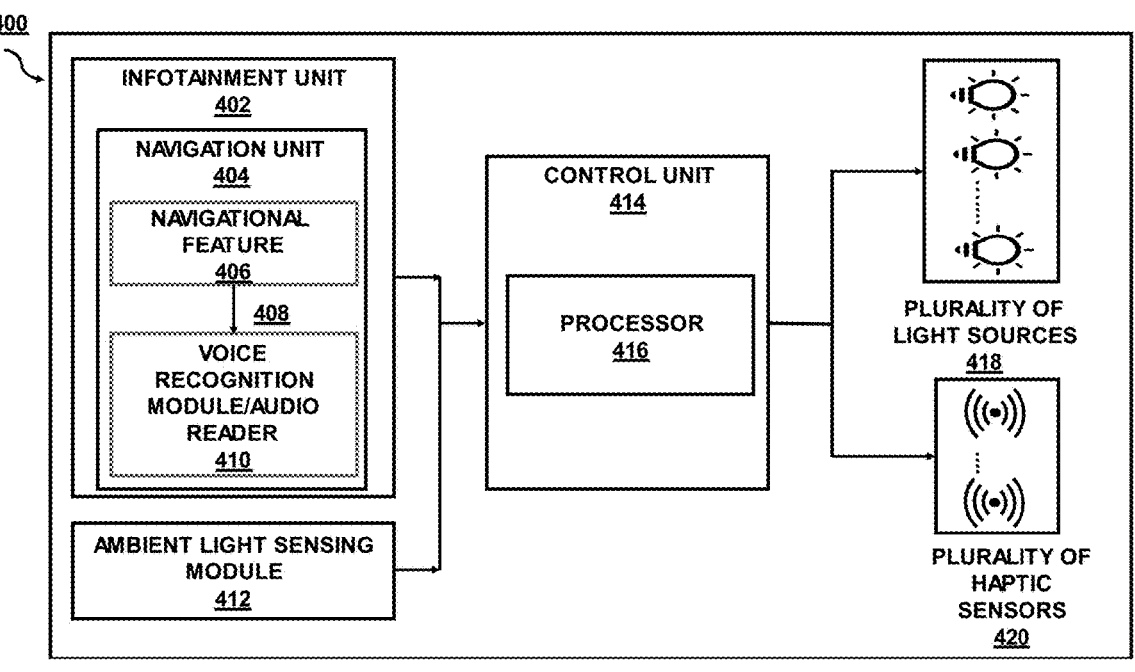
FIG. 4 depicts an exemplary block diagram 400 illustrating a system to provide navigation assistance using voice recognition via an infotainment unit, in accordance with some embodiments of the present disclosure.

In context of yet another non-limiting embodiment of the present disclosure, referring to FIG. 4, it illustrates a block diagram of a navigation assistance system 400 facilitated by the voice recognition-based solution which in turn is being implemented by an infotainment unit 402. In one non-limiting embodiment of the present disclosure, the infotainment unit 402 may be a dashboard or any other similar system which is well equipped to provide data visualizations and audio for a pre-stored information, or any other data received from a linked database.

The infotainment unit 402 comprises a navigation unit 404 which is well equipped to provide navigational application 406 along with other informative and entertainment related features. This navigation unit 404 of the infotainment unit 402 is capable of generating communication signals 408 indicating the navigational information and guiding about the upcoming navigational events. In one non-limiting embodiment, the communication signal 408 generated by the navigation unit 404 may be the audio signal providing the information about the navigating route while maneuvering turn by turn. In yet another embodiment, the navigation unit 404 of the infotainment unit 402 may also generate pictorial information and display it on the screen of the infotainment unit 402 along with the communication signal 408. The communication signal 408 from the navigation feature/application 406 is fed to the voice recognition module/audio reader 410 which is in turn is configured with navigation related vocabulary. Once the voice recognition module 410 receives the audio signal 408, it converts the audio signals into the corresponding navigational related events information as explained by an exemplary scenario in the foregoing paragraphs. These navigation related events generated by the voice recognition module/audio reader 410 are in turn transmitted to the control unit 414 via a communication protocol. The control unit 414 processes the received navigation related event information through a dedicated processor 416 and based on the navigation related event information controls the requisite plurality of haptic sensors 420.

Further, the navigation assistance system 400 comprises of an ambient light sensing module 412 which is configured to measure the ambient (environmental) light conditions and generate the ambient light information. This information is further transmitted to the Control unit 414 which utilizes it to control the illumination and characteristic of plurality of the light sources such that it does not disturb the driver and is just optimum enough to catch driver's attention in his peripheral view. In particular, the generated ambient light information by the ambient light sensing module 412 is received by the processor 416 of the control unit 414 which analyses the received signal, processes it to extract the ambient light condition information associated with it. The processor 416 further processes the extracted ambient light condition information to adjust the illumination and characteristic of light received from the plurality of light sources 418. In one non-limiting embodiment of the present disclosure, the control unit 414 may be further configured to vary the patterns of illumination of the plurality of light sources 418, same is explained in the upcoming paragraphs in conjunction with FIG. 9. Further, in another non-limiting embodiment of the present disclosure, the control unit 414 may be further configured to generate vibration patterns for the haptic feedback received via the plurality of haptic sensors 420, same is explained in the upcoming paragraphs in conjunction with FIG. 10 of the present disclosure.

Figure 5:
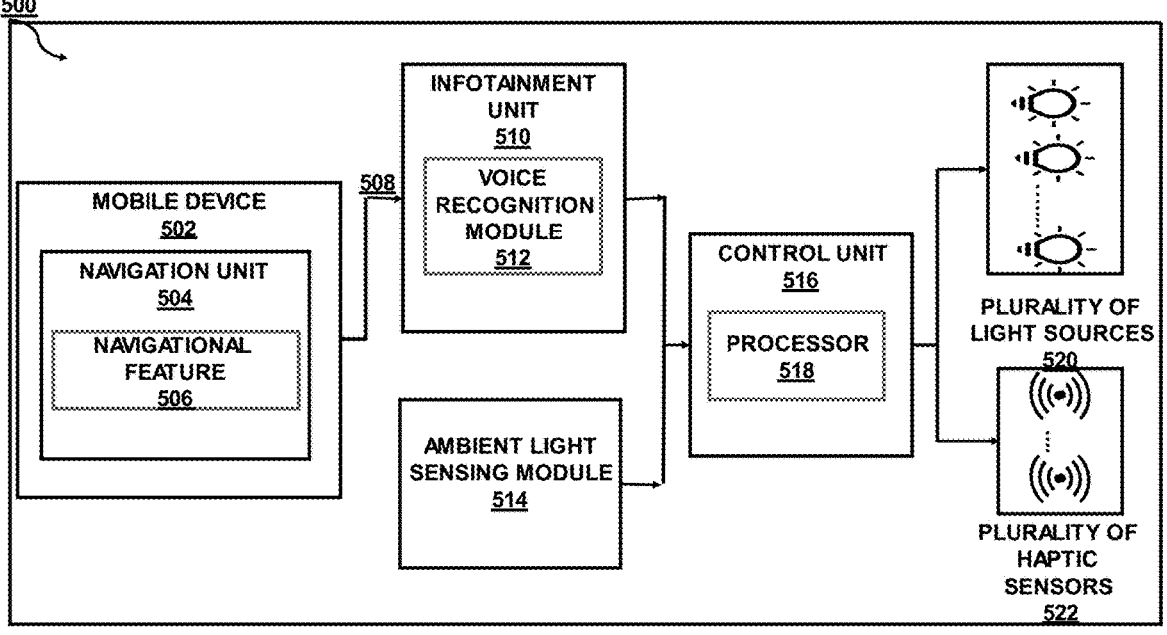
FIG. 5 depicts an exemplary block diagram 500 illustrating a system to provide navigation assistance using voice recognition via a combination of the mobile device and the infotainment unit, in accordance with some embodiments of the present disclosure.

In yet another non-limiting embodiment of the present disclosure, the navigation assistance system is facilitated by the voice recognition module, where a combination of the mobile device and the infotainment unit is used to provide the navigation information as illustrated by FIG. 5 of the present disclosure. FIG. 5 thus illustrates a navigation assistance system 500 which is being implemented by a combination of the mobile device 502 and the infotainment unit 508. The mobile device 502 has a navigation unit 504 which is well equipped to provide navigational feature 506 along with other relevant features. This navigation unit 504 of the mobile device 502 is capable of generating communication signals 508 indicating the navigational information and guiding the vehicle occupants about the upcoming navigational events. In one non-limiting embodiment, the communication signal 508 generated by the navigation unit 404 may be the audio signal providing the information about the navigating route while maneuvering turn by turn events. This audio/communication signal 508 in turn received by the infotainment unit 510 is fed to its voice recognition module/audio reader 512 which on receiving the communication signal 508, extracts navigation information and provide navigation related events information to the control unit as explained by an exemplary scenario in the foregoing paragraphs. These navigation related events generated by the voice recognition module/audio reader 512 are in turn transmitted to the control unit 516 by using a communication protocol (i.e., supported by the control unit and infotainment unit). The control unit 516, based on the navigation related event information effectively control the requisite plurality of light sources 520 as well as the plurality of haptic sensors 522 based on the received navigational information.

Further, the function of an ambient light sensing module 514 and the controlling function of the plurality of light sources based on the ambient light information remains the same as presented in the foregoing paragraphs. Same is not described again for the sake of brevity.

In yet another non-limiting embodiment of the present disclosure, the navigation assistance system is facilitated by the Navigation Application SDK (Software Development Kit). The navigation application SDK is a collection of tools, libraries, and APIs (Application Programming Interfaces) that may be customized for supporting a set of functionalities. In the present disclosure, SDK is used for providing navigation-related features required for navigation assistance. In an exemplary embodiment, the navigation related features may be provided via an application. In one non-limiting embodiment, SDK of present disclosure provides the necessary components to create applications capable of providing turn-by-turn directions, route information, location tracking, geolocation services, and other navigation-related functionalities.

Further, in one implementation, the navigation application SDK may be implemented by one or more microprocessors, microcomputers, microcontrollers, digital signal processors, central processing units, state machines, logic circuitries, and/or any devices that manipulate signals based on operational instructions.

Figure 6:
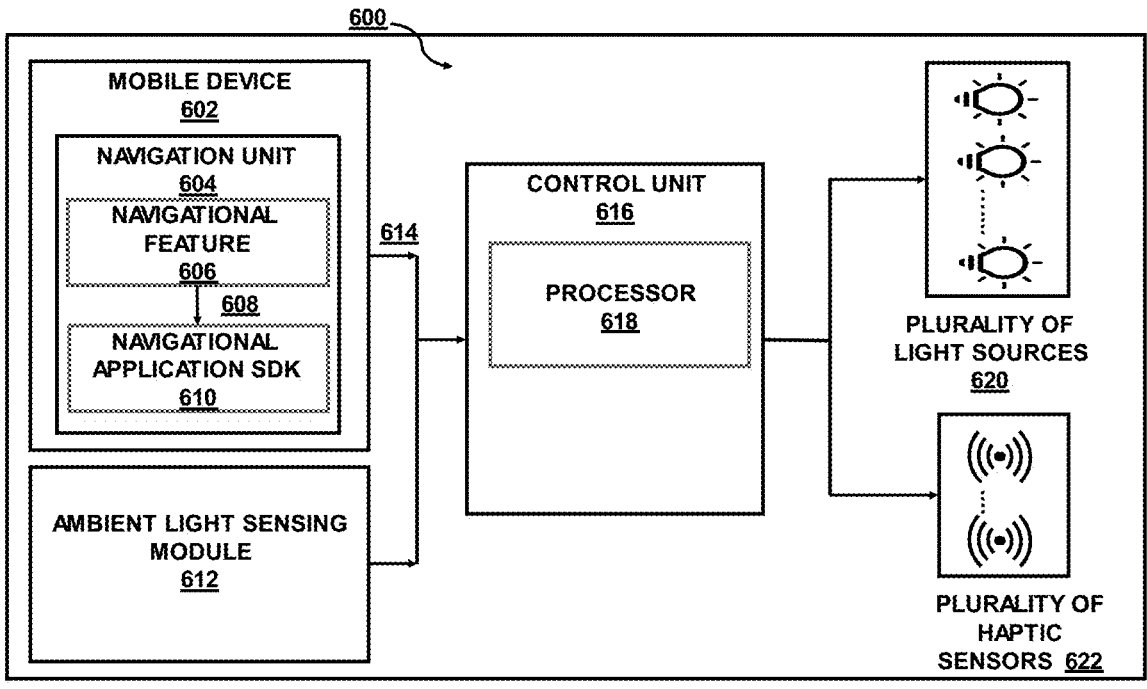
FIG. 6 depicts an exemplary block diagram 600 illustrating a system to provide navigation assistance using Navigation Application SDK (Software Development Kit) via a mobile device, in accordance with some embodiments of the present disclosure.

FIG. 6 illustrates one such non-limiting embodiment which provides a navigation assistance system 600 facilitated by a navigation application SDK which in turn is being implemented by the mobile device 602. This mobile device 602 has a navigation unit 604 which has a well-equipped navigational feature/application 606 configured to effectively navigate the routes to a pre-defined destination. The customized navigation application SDK 610 in turn receives the input 608 from the navigation feature 606 of the navigation unit 604. In one non-limiting embodiment of the present disclosure, this received input 608 to the navigation application SDK may provide a communication signal 614 i.e., SDK API signal to read the navigation information concerned with the upcoming navigation event for effectively maneuvering turn by turn navigation related events to the control unit 616. The control unit 616 extracts the navigation related event information from the API signal and process it by using a customized processor 618 in order to effectively control the requisite plurality of light sources 620 as well as the plurality of haptic sensors 622.

Further, the navigation assistance system 600 comprises of an ambient light sensing module 612 which is configured to measure the ambient (environmental) light conditions and generate the information regarding the same. This information is further transmitted to the Control unit 616 which utilizes it to control the intensity of the light sources such that it does not disturb the driver and is just optimum enough to catch driver's attention in his/her peripheral view. So, the generated ambient light information by the ambient light sensing module 612 is also received as the input by the processor 618 of the control unit 616. The processor 618 processes the ambient light information associated with it. The processor 618 further processes the extracted light signal information to adjust the illumination and characteristic of the light received from the plurality of light sources 620. In one non-limiting embodiment of the present disclosure, the control unit 616 may be further configured to vary the patterns of illuminating the plurality of light sources 620 which is explained in the upcoming paragraphs in conjunction with FIG. 9. Further, in another non-limiting embodiment of the present disclosure, the control unit 616 may be further configured to vary the patterns of vibrations in the plurality of haptic sensors 622 which is explained in the upcoming paragraphs in conjunction with FIG. 10 of the present disclosure.

Figure 7:
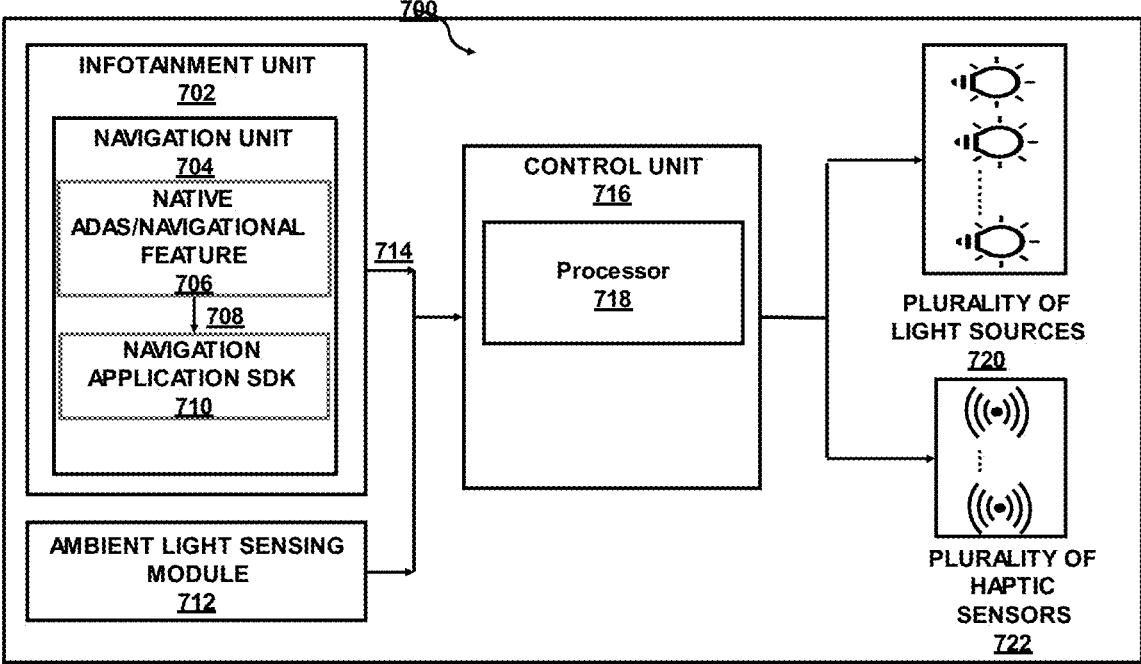
FIG. 7 depicts an exemplary block diagram 700 illustrating a system to provide navigation assistance using Navigation Application SDK (Software Development Kit) via an infotainment unit, in accordance with some embodiments of the present disclosure.

FIG. 7 of the present disclosure illustrates yet another non-limiting embodiment of a navigation assistance system 700 facilitated by the navigation application SDK. This embodiment is implemented by an infotainment unit 702. The infotainment unit 702 comprises a navigation unit 704 which is well equipped to provide native navigational/ADAS application 706 along with other informative and entertainment related features. The navigation application SDK 710 is a customized application running on the infotainment unit to read the navigation related events using the SDK API signal i.e., communication signal 708 generated by the navigation application SDK 710. The communication signal 714 may be any form of digital or analog signal (API) which carries the navigational information concerned with the upcoming navigation event for effectively maneuvering turn by turn navigation related events is transmitted to the control unit 716 for further processing. The control unit 716 further processes the navigational information via its customized processor 718 to effectively control the requisite plurality of light sources 720 as well as the plurality of haptic sensors 722.

Further, the navigation assistance system 700 comprises of an ambient light sensing module 712 which is configured to measure the ambient (environmental) light conditions and generate the ambient light condition information. This information is further transmitted to the Control unit 716 and processed in similar way as presented in foregoing paragraphs. Further, the control unit 716 also processes the navigation information (received from the infotainment unit), and ambient light information in the similar way to control functioning of plurality of light sources as presented in foregoing paragraphs of the disclosure.

Figure 8:
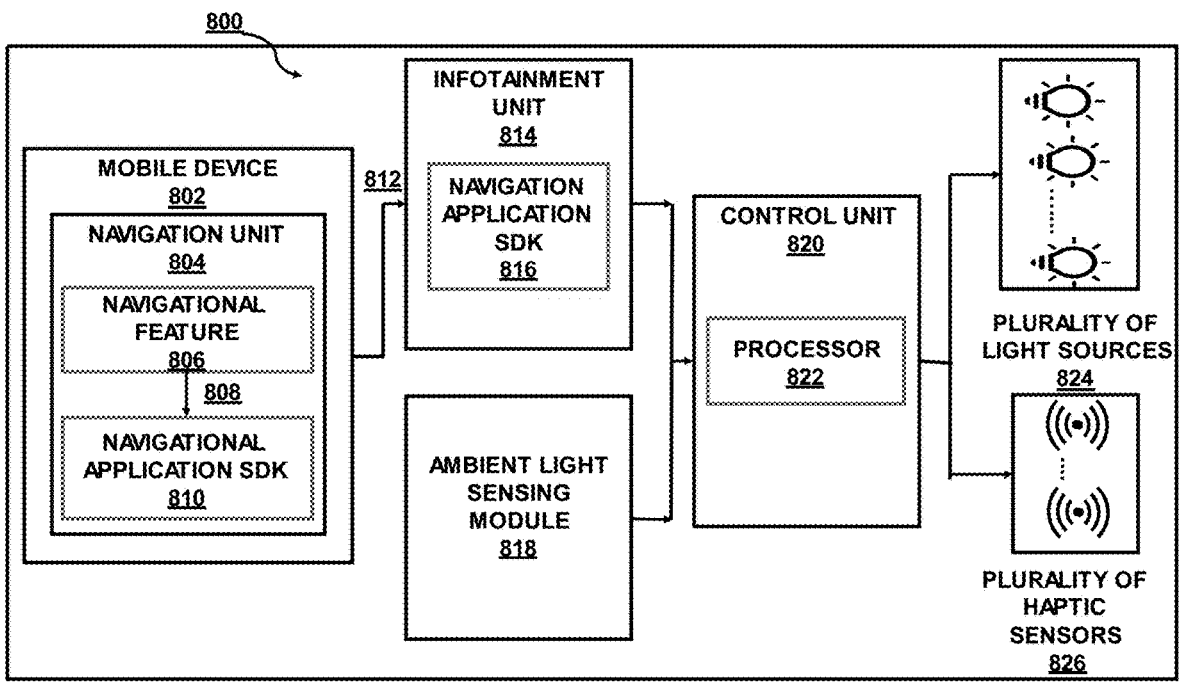
FIG. 8 depicts an exemplary block diagram 800 illustrating a system to provide navigation assistance using Navigation Application SDK (Software Development Kit) via a combination of the mobile device and the infotainment unit, in accordance with some embodiments of the present disclosure.

In yet another non-limiting embodiment of the present disclosure, the navigation assistance system facilitated by the navigation application SDK based solution may also be implemented by the combination of the mobile device and the infotainment unit as illustrated by FIG. 8 of the present disclosure. FIG. 8 thus illustrates a navigation assistance system 800 which is being implemented by a combination of the mobile device 802 and the infotainment unit 812. The mobile device 802 has a navigation unit 804 which has a well-equipped navigational feature/application 806 configured to effectively navigate the routes to a pre-defined destination. The navigation application SDK 810 in turn receives the input 808 from the navigation feature 806 (once turned on) of the navigation unit 804. However, in another non-limiting embodiment, the navigation application SDK may feed on the generated navigational information by the navigation feature 806 directly. The navigation application SDK 810 in turn provides a communication signal 812 to the infotainment unit 814 via Bluetooth or USB connection. The communication signal may provide information pertaining to the upcoming navigation events. In an embodiment, the communication signal 812 may be any form of digital or analog signal (API) which carries the navigational information concerned with the upcoming navigation event to the infotainment unit 814 for further processing.

The infotainment unit 814 receives the navigational information which is further processed by the navigation application SDK 816 and is transmitted to the control unit 820 via CAN. The control unit 820 in turn extracts the navigation related event information and process it further to effectively control the requisite plurality of light sources 824 as well as the plurality of haptic sensors 826.

Further, the navigation assistance system 800 comprises of an ambient light sensing module 818 which is configured to measure the ambient (environmental) light conditions and generate the information regarding the same. This information is further transmitted to the Control unit 820 in similar way as presented in foregoing paragraphs. Further, the control unit 820 also processes the navigation information (received from the combination of mobile device and infotainment unit), and ambient light information to control functioning of the plurality of light sources in the similar way as presented in foregoing paragraphs of the disclosure.

Figure 9:
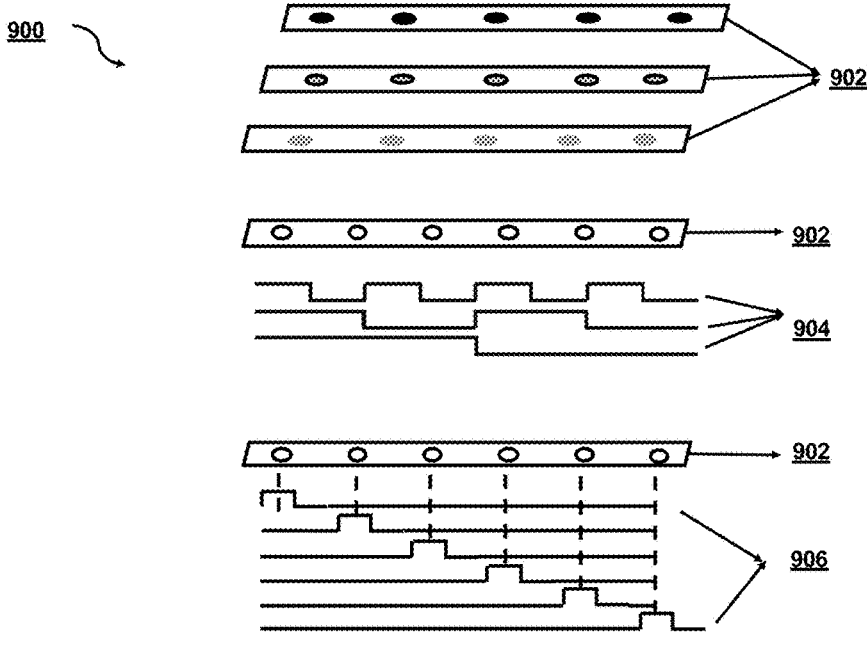
FIG. 9 depicts exemplary illumination patterns generated by the plurality of light sources to receive attention of the driver and vehicle occupants viz-a-viz the upcoming navigation event, in accordance with the embodiments of the present disclosure.

Now with reference to the FIG. 9 of the present disclosure, it illustrates the different patterns 900 in which the plurality of light sources 902 may be illuminated to catch the attention of the driver in his/her peripheral vision while driving the vehicle. These patterns are generated in accordance with the control signals provided by the control unit to the plurality of light sources. In one non-limiting embodiment, the plurality of light sources 902 may be multi-coloured and thus may be illuminated in variation with their respective colours i.e., one colour set of light sources may be illuminated at any instant of time and then second colour set of light sources are illuminated at the other instant of time and so on. In another embodiment, the brightness of light may depend on the ambient light conditions. In another embodiment, the colour of the light in the plurality of light sources may depend on the one or more navigation events. For example, for navigation related event such as straight, the colour of light may be selected as green whereas for navigation related event such as turn left/turn right, the colour for light may be yellow. A person skilled in the art may appreciate that colour selection for the plurality of light sources may be customized at the time of installing the navigation assistance system and/or at later stage based on user requirement. In yet another non-limiting embodiment, the plurality of the light sources 902 may be illuminated with variation in flashing i.e., by changing ON/OFF time duration to create different illumination patterns 904. In yet another embodiment, the plurality of light sources 902 may be controlled such as to create a sequential pattern 906. It should be noted that illumination patterns of the plurality of light sources 902 are not restricted to the above discussed ones and may be customized based on the requirement.

Similarly, FIG. 10 illustrates different vibration patterns 1000 generated by the plurality of haptic sensors 1004 that are placed on a steering wheel 1002 of the driving vehicle 102. In one non-limiting embodiment of the present disclosure, the control unit may send feedback corresponding to the navigation information to the haptic sensors. According to the feedback received, the haptic sensor may generate the vibration pattern in the left or right portion of the steering wheel. The vibration pattern 1006 may be generated by altering the ON/OFF timing of the vibration as illustrated in FIG. 10. In yet another embodiment, the control signals may be generated by providing sequential vibration 1008 along the plurality of haptic sensors 1004. It should be noted that haptic feedback patterns generated by the plurality of haptic sensors 1004 are not restricted to the above discussed ones and may be customized based on the requirement. Further, in an embodiment, along with the vibration pattern, the control unit may also alter the frequency of vibration in the haptic sensors. Referring back to FIGS. 9 and 10, in one non-limiting embodiment, the plurality of light sources 902 and plurality of haptic sensors 1004 may be embedded in the driving vehicles 102 during their manufacturing. However, in another non-limiting embodiment of the present disclosure, the plurality of light sources 902 may be retrofitted with suction cup attached to mount it at the inner peripheral surfaces of the existing vehicles.

FIG. 11 illustrates a flowchart 1100 of an exemplary method for providing navigation assistance in accordance with an embodiment of the present disclosure. The method 1100 may also be described in the general context of computer executable instructions. Generally, computer executable instructions may include routines, programs, objects, components, data structures, procedures, modules, and functions, which perform specific functions or implement specific abstract data types.

The order in which the method 1100 is described is not intended to be construed as a limitation, and any number of the described method blocks may be combined in any order to implement the method. Additionally, individual blocks may be deleted from the methods without departing from the spirit and scope of the subject matter described.

At step 1102, the method 1100 may include acquiring placement information for a plurality of light sources and a plurality of haptic sensors at one or more inner peripheral surfaces of the vehicle for illuminating in a predefined pattern. Further, in one non-limiting embodiment, acquiring the placement information for the plurality of light sources may include placing the plurality of light sources at such places inside the vehicle to catch attention of the vehicle occupants e.g., driver and other passengers present in the vehicle as illustrated in FIGS. 1B and 1C. Further, the plurality of light sources may provide illumination pattern and plurality of haptic sensors may provide vibration pattern to receive attention of the vehicle occupants.

At step 1104, the method 1100 may include generating navigation information, pertaining to one or more navigation related events. In one non-limiting embodiment, the navigation unit 202 is used for generating this navigation information via at least one mobile device and/or infotainment unit.

At step 1106, the method 1100 may include measuring light conditions of an environment of the vehicle for generating ambient light information. In one non-limiting embodiment, an ambient light sensing module 204 may be used to measure the ambient light conditions in order to obtain the existing light intensity information.

At step 1108, the method 1100 may include receiving the navigation information and the ambient light information. In one non-limiting embodiment, the control unit 206 may be configured to receive these navigation and ambient light information.

At step 1110, the method 1100 may include processing the navigation information and the ambient light information. The control unit extracts the requisite navigation information and light intensity information from the received the communication signal and light signal and processes it further to control the plurality of light sources and the plurality of haptic sensors. In one non-limiting embodiment, the control unit 206 may comprise a voice recognition module to process the received navigation information. In another non-limiting embodiment, the control unit 206 may comprise a navigation application SDK to process the received navigation information. In yet another non-limiting embodiment, the control unit 206 may comprise a processor to process both the navigation information as well as the ambient light information. Same may be understood by referring the FIG. 11A.

FIG. 11A represents the method steps followed for processing the navigation information and the ambient light information.

At step 1110A, the method includes receiving at least one communication signal and a light signal. In one non-limiting embodiment of the present disclosure, the at least one communication signal may be received from the navigation unit and the light signal is received from the ambient light sensing module.

At step 1110B, the method includes extracting at least information of the one or more navigation events from the at least one communication signal and ambient light condition from the light signal. In one non-limiting embodiment of the present disclosure, the information is extracted by the control unit.

At step 1110C, the method includes processing the extracted information of the one or more navigation related events and the ambient light condition for controlling the plurality of light sources and the plurality of haptic sensors. In one non-limiting embodiment of the present disclosure, the processor of the control unit processes the extracted information of the one or more navigation related events and the ambient light condition for controlling the plurality of light sources and the plurality of haptic sensor.

At step 1112, the method 1100 may include controlling the functions of at least one of the plurality of light sources and the plurality of haptic sensors, based on the processed information. In one non-limiting embodiment, the control unit 206 included with a processor may be configured to control the characteristic of light generated by the plurality of light sources and control the vibration pattern in the haptic sensors.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed.

Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, non-volatile memory, hard drives, CD ROMs, DVDs, flash drives, disks, and any other known physical storage media.

Suitable processors include, by way of example, a general-purpose processor, a special purpose processor, a conventional processor, a digital signal processor (DSP), a graphic processing unit (GPU), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

Advantages of the Embodiment of the Present Disclosure are Illustrated Herein

In an embodiment, the present disclosure provides techniques for providing navigation assistance to driver in his/her peripheral vision so as not to cause any distraction as the driver is not required to take the eyes off from the road, thus enabling safe driving ecosystem preventing accidents.

In an embodiment, the present disclosure provides techniques to enable hassle free driving experience for the driver and other passengers as they are not required to look at navigational information being displayed at the mobile screens or dashboards in order to know the upcoming navigational event and may get the requisite information in their peripheral visions.

In an embodiment, the present disclosure provides techniques to retrofit the plurality of light sources in the existing vehicle thus serving the requisite objective for both the existing as well as newly manufactured vehicles.

In another embodiment, the present disclosure does not interrupt the ongoing audio play on an infotainment system since the present disclosure only takes audio input from the infotainment system for controlling the light sources and Haptics only and not over audio.

REFERENCE NUMERALS

Exemplary environment 100
Driving vehicle 102
Plurality of light sources 104, 106, 108, 100, 112, 116, 208, 318, 418, 520, 620, 720, 826
Steering wheel 100B
Steering Hub 114
Plurality of haptic sensors 118, 210, 320, 420, 522, 622, 722, 826
Navigation unit 202, 304, 404, 504, 604, 704, 804
Communication signal 308, 408, 508, 614, 714, 812
Ambient light sensing module 204, 310, 412, 514, 612, 712, 818
Control unit 206, 312, 414, 516, 616, 716, 820
Navigational Feature 306, 406, 506, 606, 706, 806
Voice recognition module 314, 410, 512
Processor 316, 416, 518, 618, 718, 822
Navigation application SDK 610, 710, 718, 810,
Method 1100 with steps 1102-1110 (1110A-1110C), 1112
What is claimed is:

1. A navigation assistance system for a vehicle, comprising:
   a plurality of light sources placed at one or more inner peripheral surfaces of the vehicle to illuminate in a pre-defined pattern;
   a plurality of haptic sensors placed on a steering wheel of the vehicle to generate haptic feedback, in a predefined pattern;
   a navigation unit configured to generate navigation information pertaining to one or more navigation related events;
   an ambient light sensing module configured to measure light conditions of an environment of the vehicle to generate ambient light information; and
   a control unit communicatively coupled to the plurality of light sources, the plurality of haptic sensors, the ambient light sensing module and the navigation unit, the control unit is configured to:
      receive the navigation information and the ambient light information; and
      process the received navigation information and the ambient light information; and
      control functioning of at least one of the plurality of light sources and at least one of the plurality of haptic sensors, based on the processed information.
2. The navigation assistance system of claim 1, wherein the one or more inner peripheral surfaces comprises at least on one of: windscreen rail/Sun Visor, Dash panel, A Pillars (A-Post,), and upper arc of the Steering wheel of the vehicle, Center pillars (BC-post,) and back of front seats to provide navigation assistance to vehicle occupants; and
   wherein the plurality of haptic sensors is placed at a left and right arch of the steering wheel to provide navigation assistance to a vehicle driver.
3. The navigation assistance system of claim 1, wherein the received navigation information comprises at least one communication signal corresponding to the one or more navigation related events.
4. The navigation assistance system of claim 1, wherein to control functioning of the at least one of the plurality of light sources, the control unit is configured to:
   adjust illumination and characteristic of light received from the at least one of the plurality of light sources, in accordance with the ambient light information and the navigation information, wherein the characteristic of the light comprises colour and light intensity.
5. The navigation assistance system of claim 1, wherein to control functioning of the plurality of haptic sensors, the control unit is configured to adjust vibration pattern and frequency of the at least one of the plurality of haptic sensors in accordance with the navigation information.
6. The navigation assistance system of claim 1, wherein to process the received navigation information and the ambient light information, the control unit is configured to:
   receive at least one communication signal from the navigation unit and a light signal from an ambient light sensing module;
   extract at least one of: information of the one or more navigation events from the at least one communication signal and ambient light condition from the light signal; and
   process the extracted information and the ambient light condition to control the plurality of light sources and the plurality of haptic sensors.
7. A method for providing navigation assistance in a vehicle, the method comprising:
   acquiring placement information for a plurality of light sources placed at one or more inner peripheral surfaces of the vehicle to illuminate in a pre-defined pattern and a plurality of haptic sensors placed on a steering wheel of the vehicle to generate haptic feedback in a pre-defined pattern;
   generating, by a navigation unit, a navigation information, pertaining to one or more navigation related events;
      measuring, by an ambient light sensing module, light conditions of an environment of the vehicle for generating ambient light information;
      receiving the navigation information and the ambient light information;
      processing the received navigation information and the ambient light information; and
   controlling functions of at least one of the plurality of light sources and the plurality of haptic sensors using the acquired placement information, based on the processed information.
8. The method for providing navigation assistance of claim 7, wherein the received navigation information further comprises:
   receiving at least one communication signal corresponding to the one or more navigation related events, wherein the one or more navigation related events comprises:
      at least one of a turn left, a turn right, a straight, a ramp up, a ramp down, a clockwise U turn, or an anti-clockwise U turn.

9. The method for providing navigation assistance of claim 7, wherein controlling functions of:

the at least one of the plurality of light sources comprises:

adjusting illumination and characteristic of light received from the at least one of the plurality of light sources, in accordance with the ambient light information and the navigation information, wherein the characteristic of the light comprises colour and light intensity; and the at least one of the plurality of haptic sensors comprises:

adjusting vibration pattern and frequency of the at least one of the plurality of haptic sensors in accordance with the navigation information.

10. The method assistance system of claim 7, wherein processing the received navigation information and the ambient light information comprises:

receiving at least one communication signal and a light signal;

extracting at least one of: information of the one or more navigation related events from the at least one communication signal and ambient light condition from the light signal; and processing the extracted information and the ambient light condition for controlling the plurality of light sources and the plurality of haptic sensors.

11. A non-transitory computer-readable medium storing computer-executable instructions for providing navigation assistance in a vehicle, the computer-executable instructions configured for:

acquiring placement information for a plurality of light sources placed at one or more inner peripheral surfaces of the vehicle to illuminate in a pre-defined pattern and a plurality of haptic sensors placed on a steering wheel of the vehicle to generate haptic feedback in a pre-defined pattern;

generating, by a navigation unit, a navigation information, pertaining to one or more navigation related events;

measuring, by an ambient light sensing module, light conditions of an environment of the vehicle for generating ambient light information;

receiving the navigation information and the ambient light information;

processing the received navigation information and the ambient light information; and controlling functions of at least one of the plurality of light sources and the plurality of haptic sensors using the acquired placement information, based on the processed information.

12. The non-transitory computer-readable medium of claim 11, wherein the computer-executable instructions are configured to receive navigation information by:

receiving at least one communication signal corresponding to the one or more navigation related events, wherein the one or more navigation related events comprises:

at least one of a turn left, a turn right, a straight, a ramp up, a ramp down, a clockwise U turn, or an anti-clockwise U turn.

13. The non-transitory computer-readable medium of claim 11, wherein the computer-executable instructions are configured to control the functions of:

the at least one of the plurality of light sources comprises:

adjusting illumination and characteristic of light received from the at least one of the plurality of light sources, in accordance with the ambient light information and the navigation information, wherein the characteristic of the light comprises colour and light intensity; and the at least one of the plurality of haptic sensors comprises:

adjusting vibration pattern and frequency of the at least one of the plurality of haptic sensors in accordance with the navigation information.

14. The non-transitory computer-readable medium of claim 11, wherein the computer-executable instructions are configured to process the received navigation information and the ambient light information by:

receiving at least one communication signal and a light signal;

extracting at least one of: information of the one or more navigation related events from the at least one communication signal and ambient light condition from the light signal; and processing the extracted information and the ambient light condition for controlling the plurality of light sources and the plurality of haptic sensors.

* * * * *